United States Patent [11] 3,609,700

[72] Inventors James E. Wollum
Glendora;
Richard S. Sharp, Sierra Madre, both of Calif.

[21] Appl. No. 14,169
[22] Filed Feb. 24, 1970
[45] Patented Sept. 28, 1971
[73] Assignee Burroughs Corporation
Detroit, Mich.

[54] DATA PROCESSING SYSTEM HAVING AN IMPROVED FETCH OVERLAP FEATURE
14 Claims, 3 Drawing Figs.

[52] U.S. Cl. .......... 340/172.5
[51] Int. Cl. .......... G11c 7/00, G06f 9/00
[50] Field of Search .......... 340/172.5

[56] References Cited
UNITED STATES PATENTS

| | | | |
|---|---|---|---|
| 3,533,077 | 10/1970 | Bell et al. | 340/172.5 |
| 3,202,969 | 8/1965 | Dunwell et al. | 340/172.5 |
| 3,266,020 | 8/1966 | Cheney et al. | 340/172.5 |
| 3,401,376 | 9/1968 | Barnes et al. | 340/172.5 |
| 3,533,075 | 10/1970 | Johnson et al. | 340/172.5 |

*Primary Examiner*—Gareth D. Shaw
*Attorney*—Christie, Parker & Hale

ABSTRACT: An improvement in a fetch overlap feature for a data processing system results from providing multiple interfaces between the system data processor and the system memory. The memory is divided into a plurality of independent units each having its own interface. The data processor can retrieve more than one word from the memory system at the same time without incurring contention between memory access orders. The data processor is thereby enabled to begin to fetch its next instruction even if its current instruction orders the data processor to retrieve an operand.

INVENTORS
JAMES E. WOLLUM
RICHARD S. SHARP
BY
Christie, Parker & Hale
ATTORNEYS

DATA PROCESSING SYSTEM HAVING AN IMPROVED FETCH OVERLAP FEATURE

BACKGROUND OF THE INVENTION two virtue

1. Field of the Invention

This invention relates to data processing systems and, more particularly, to data processing systems having a fetch overlap feature.

2. Description of the Prior Art

Conventional data processing systems solve problems and manipulate data in a sequential manner. That is, a data processor performs its assigned tasks in a series of discrete steps which are performed one at a time. Each discrete step divides into a instruction-fetch phase and execute-operation phase. During the instruction-fetch phase, the data processor retrieves an instruction word from the memory unit. The instruction words contain an operator field comprising a set of numbers representing in encoded form the specific type of operation which the data processor is to perform during the execute-operation phase. The instruction word also contains other fields of data which are to be used during the execute-operation phase. For example, the instruction word could contain an operand address field comprising a set of numbers representing in encoded form the address of a memory cell which contains an operand to be used in a computation. During the first part of the execute-operation phase, the data processor would retrieve the operand from memory which is specified by the operand address field of the instruction word. During the remainder of the execute-operation phase, arithmetic and control means within the data processor would make a computation using the retrieved operand. When the data processor completes the computation, the execute-operation phase ends and the data processor is ready to perform the next step in sequence.

The power of modern data processing systems is largely attributable to two features. Firstly, the electronic components of the system exhibit great speed in handling data. Therefore, the data processor can perform its assigned tasks quickly, even though these tasks are broken down into an enormous number of steps. Secondly, the data processor can manipulate its instructions during the course of performing its assigned task. implement this second feature, it is necessary to provide a memory which can be written into as well as read from for storing the instruction set. Data processors having this second feature are commonly called internally programmed or stored program machines, and data processors lacking this feature are commonly called externally programmed or plugboard controlled machines.

As data processing technology expanded, the speed of the electronic components of the data processor quickly outstripped the speed of the memory. The time required for the data processor to gain access to a particular memory cell and cause the word stored in the memory cell to be brought into the data processor, commonly called memory access period, began to consume a large portion of the time required to perform a processing task. The data processor cannot perform a useful computational process on these memory words during the memory access period. Thus, the processing inefficiency introduced by the memory cycle period imposed severe limitations on the overall system processing speed.

An approach taken in the prior art to increase processing efficiency has been to change the system mode of operation from a purely sequential mode to a more or less parallel mode. That is, the data processing system performs portions of distinct operational steps at the same time. Means are provided for causing one functional unit of the system to start performing a function related to a subsequent operational step instead of allowing that functional unit to remain idle while it awaits another functional unit to perform its job. The fetch overlap feature found in some prior art machines is an example of this approach. Fetch overlap means that the data processor begins to fetch the next instruction in the program sequence before the end of the execute-operation phase of the current instruction. Systems having a fetch overlap feature typically include two separate registers within the data processor for the temporary storage of instruction words. The first is commonly called an instruction-register; the second is commonly called a command-execution register. In operation the data processor fetches an instruction word from the sequence of program steps stored in memory and loads that word into the instruction-register. After the instruction-fetch phase is completed, the instruction can be transferred into the command-execution register where it is stored during the execute-operation phase. The release of the instruction from the instruction register makes that register available for storage of the next instruction word since it is no longer necessary for that register to store the current instruction word while the processor goes through the execute-operation phase. If the data processor can complete the instruction-fetch phase of the next instruction before it finishes the execute-operation phase of the current instruction, the data processor can begin the execute-operation phase of the next instruction without any of the delay associated with memory access period. However, a significant factor limits the speed improvement offered by the fetch overlap feature. Typically, an instruction word directs the data processor to retrieve a word from memory. Therefore, during the execute-operation phase of that instruction word, the data processor will be communicating with the memory through the interface between the processor and memory. While the data processor/memory interface is being used for this communication, it is tied up and the fetching of the next instruction word from memory must be temporarily postponed.

SUMMARY OF THE INVENTION

Broadly, the present invention is directed to a data processing system having high processing efficiency because of the incorporation of means enabling the process of fetching instructions to proceed independently of the process of executing operations. In circumstances in which these processes are totally independent the data processor can perform the two distinct processes simultaneously without contention or interference between them.

An embodiment of the present invention in a data processing system includes a memory system having two independent interfaces between the memory system and a data processor. Access control means are provided for controlling the exchange of digital words, such as instruction words and operand words, between the memory system and the data processor via these independent interfaces. The data processor includes an instruction register for temporarily storing instruction words and a word register for temporarily storing operand words. Cross-point switching circuits couple these registers to the interfaces to enable either register to communicate with the memory system via either interface. In operation the data processor fetches an instruction word from memory and decodes it in a conventional manner to determine what type of processing operation is ordered. After this processing operation has been ordered, the instruction word is no longer needed, therefore the instruction register releases this word. With the instruction register empty the data processor simultaneously performs the execute-operation phase initiated by this instruction and begins to perform the independent process of fetching the next instruction word in sequence. In contrast to prior art systems having a fetch overlap feature, the data processor can proceed to fetch its next instruction from the program sequence even though the data processor is simultaneously performing a memory access ordered by the current instruction. Thus, the memory access orders are occuring at the point time.

DETAILED DESCRIPTION OF THE PREFERRED EMBODIMENT

Figure 1:
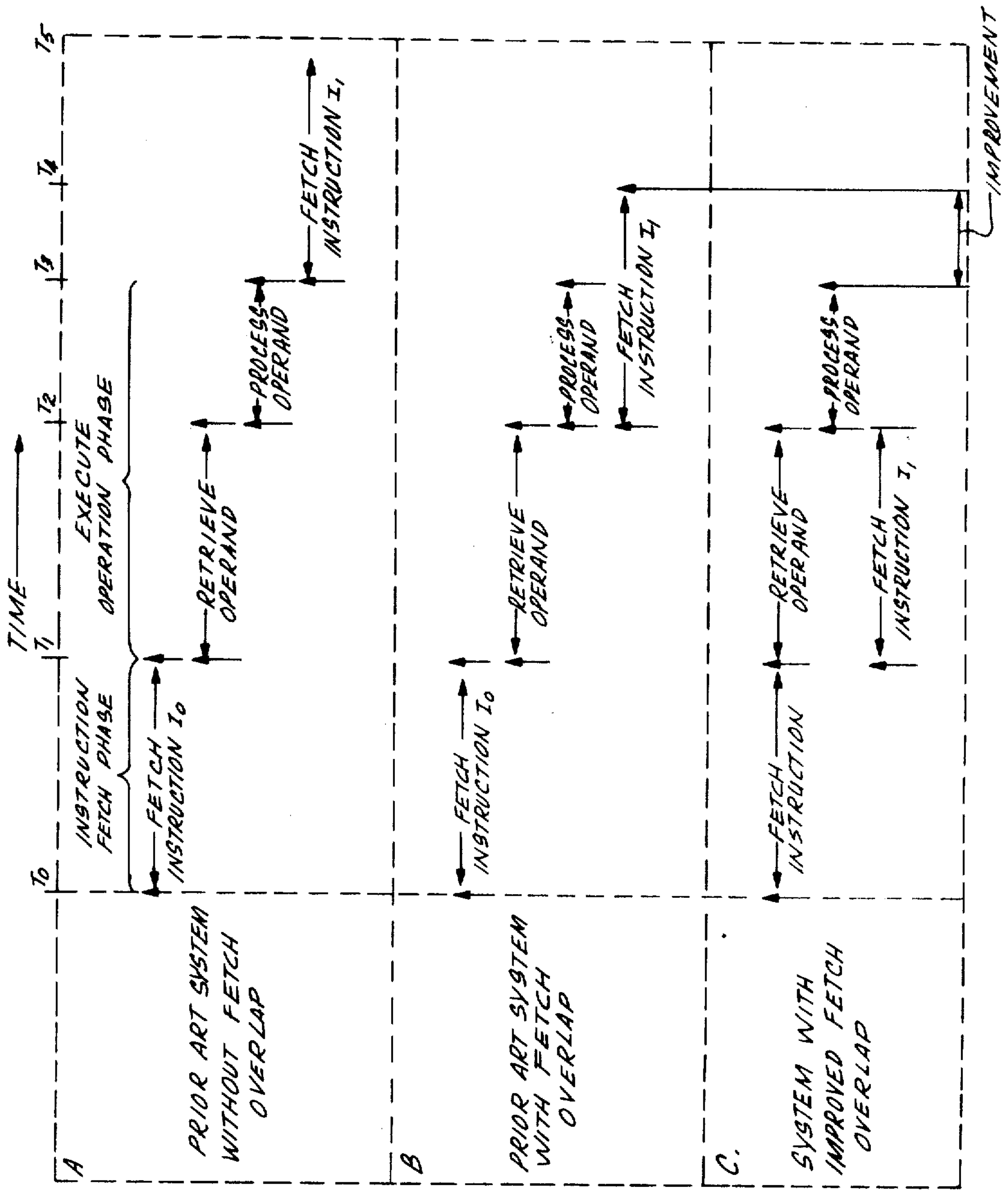
FIG. 1 is a timing diagram showing the time spacing of the instruction-fetch phase and execute-operation phase of prior art systems with and without the fetch overlap feature and a system embodying the present invention.

FIGS. 1A and 1B illustrate with timing diagrams the operating sequence of prior art data processing systems with and without the fetch overlap feature. In the figures, the abscissa represents time and the vertical marks represent the time at which a process either begins or ends.

In FIG. 1A the times identified as $T_0$ and $T_1$ represent the start and finish respectively of the instruction-fetch phase related to instruction $I_0$. For purposes of explanation it is assumed that the execute-operation phase related to instruction $I_0$ consists of two distinct portions. First, the data processor makes a memory access to retrieve an operand word. The time required to complete this memory access is represented by the distance between times $T_1$ and $T_2$. Second, the data processor uses the retrieved operand in executing the processing operation. The time required to complete this processing operation is represented by the distance between $T_2$ and $T_3$. After this processing operation is completed the data processor begins the instruction-fetch phase related to instruction $I_1$. The time at which this phase is completed is shown at $T_5$. Thus it can be seen from the example shown in FIG. 1A that in prior art systems without a fetch overlap feature the data processor cannot begin the execute-operation phase of instruction $I_1$ until time $T_5$.

The sequence of events in a prior art system with the fetch overlap feature as shown in FIG. 1B are identical with those shown in FIG. 1A from time $T_0$ to time $T_2$. At time $T_2$, however, the fetch overlap beings. That is, the data processor simultaneously begins to fetch instruction $I_1$ and performs the processing operation using the operand which instruction $I_0$ ordered the data processor to retrieve from memory. It should be noted from FIG. 1B that the fetch overlap is incomplete. That is, during the first portion of the execute-operation phase of instruction $I_0$ there is no fetch overlap. As a consequence, even though there is some fetch overlap the data processor is not ready to start the execute-operation phase related to instruction $I_1$ until time $T_4$.

The A data of events in a system embodying independently present invention is shown in FIG. 1C. The instruction-fetch phase of instruction $I_0$ occupies the period between times $T_0$ and $T_1$. At time $T_1$ data processor begins to perform two independent processes simultaneously. That is, it performs the retrieve operand portion of the execute-operation phase of instruction $I_0$ at the same time it performs the instruction-fetch phase of instruction $I_1$. It should be noted that this overlapping requires the data processor to make two simultaneous operand accesses. In prior art systems without multiple interfaces between the data processor and memory, instruction could not be done. It should also be noted that by virtue of the more complete overlapping of independent operations the system embodying the present invention is ready to start the execute-operation phase of instruction $I_1$ at time $T_3$ which is much earlier than when it could be done heretofore.

Figure 2:
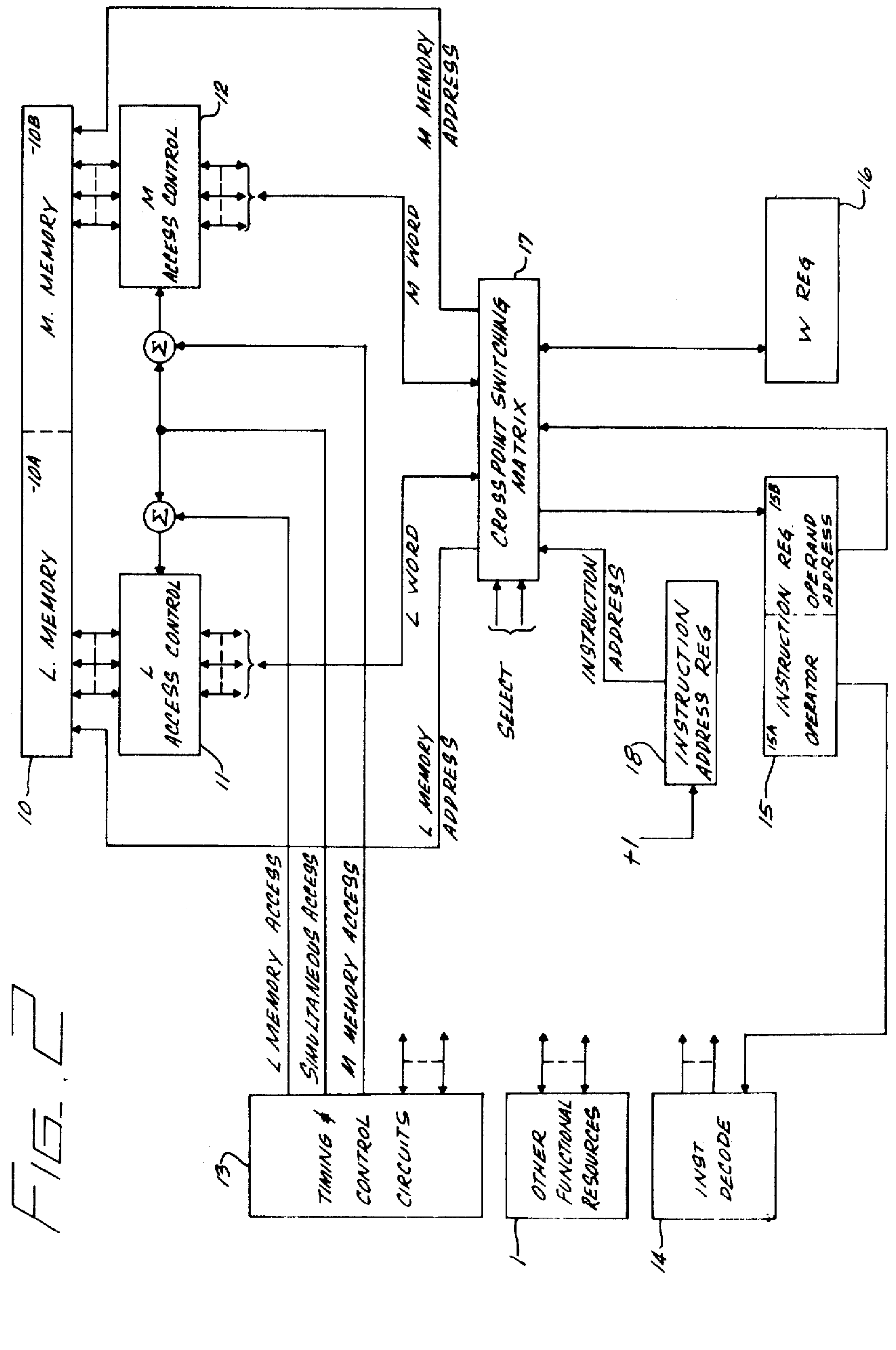
FIG. 2 is a simplified functional block diagram of a data processing system embodying the present invention.

The myriad details of the structure and mode of operation of a data processing system embodying the present invention are best understood after a consideration of the general functional resources of the system. To assist in this understanding, reference is now made to FIG. 2, which is a simplified block diagram of the general functional resources. Many of the elements which form a part of a data processor embodying the present invention are not specifically shown in FIG. 2. Their existence is only suggested by block 1. A memory system 10 is shown with a dashed line dividing the memory system into two subsystems, L memory 10A and M memory 10B. The dashed dividing line is intended to point out that the operation of L memory 10A is independent of M memory 10B. Memory system 10 could be two separately packaged random access memory subsystems, each containing an array of memory cells comprising a plurality of bit storage elements such as magnetic cores, thin film elements or the like. However, neither the spatial placement of the two subsystems nor the type of storage element is material. What is material to note is that the two subsystems are addressed and perform read and write operations independently of each other.

Below L memory 10A is shown L access control 11 and below M memory 10B form shown M access control 12. These access control elements control the reading and writing of words out of and into the memory subsystems. Lines are shown interconnecting the respective memory subsystems and the access control elements. To simplify the drawings fewer lines are shown that are actually used. Actually there are a sufficient number of lines to carry an entire word in parallel between the memory subsystems and the access control elements. Similarly, the few lines shown at the bottom of each access control unit are intended to suggest the existence of many more lines which are used to transmit an entire word in parallel between registers within the data processor and the access control element. Adjacent to each access control element is shown an encircled summation sign. The line shown coupling the encircled summation sign to the access control element carries an access command signal to activate the access control element and open a communication path between a memory subsystem and a register within the data processor. These command signals are derived from timing and control circuits which are represented by block 13 shown on the left side of the drawing. L access control 11 will respond to control signals from timing and control circuits 13 which are transmitted on either the line labeled L memory access or the line labeled simultaneous access. Similarly M access control 12 will respond to command signals transmitted from timing and control circuits 13 on the line labeled M memory access or the line labeled simultaneous access.

The particular memory cell which is to be accessed is determined by memory address information. Instruction address register 18 and operand address subregister 15B of instruction register 15 shown at the bottom of FIG. 2 store such address information. The means for coupling the registers storing address information to the memory subsystems comprises cross-point switch matrix 17, and a plurality of memory address lines. Cross-point switching matrix 17 can couple address information from instruction address register 18 to either the L memory 10A or the M memory 10B under the control of select signals carried on select lines shown to the left of cross-point switching matrix 17. Similarly operand address subregister 15B can supply a word address to either L memory 10A or M memory 10B under the control of cross-point switching matrix 17.

The means for coupling the addressed words between the memory subsystems and the sorting processor comprises the access control elements, word transmission lines, the cross-point switching matrix, instruction register 15 and W register 16. By using a cross-point switching technique there are four possible coupling paths.

First, consider the coupling path which exists for fetching an instruction word from L memory 10A. A select signal orders cross-point switching matrix 17 to couple the address information stored in instruction address register 18 to L memory 10A and it also orders switching matrix to enable control transmission path between instruction register 15 and L access control 11. In response to an access command signal L access control 11 causes a word to be read from the memory cell within L memory 10A which is addressed by the instruction address register 18, and the addressed word is coupled through the enabled transmission path and is loaded into instruction register 15.

Second, consider the coupling path which exists for fetching an instruction word from M memory 10B. When a select signal orders cross-point switching matrix 17 to couple the address information stored in instruction address register 18 to M memory 10B it also orders the switching matrix to enable a transmission path between instruction register 15 and M access control 12. In response to an access command signal M access control 12 causes a word to be read from the memory cell within M memory 10B which is addressed by instruction address register 18 and the addressed word is coupled through the enabled transmission path and is loaded into instruction register 15.

Third, consider the coupling path which exists for retrieving a word from M memory 10B and loading the retrieved word into W register 16. When a select signal orders cross-point switching matrix 17 to couple the address information stored in operand address subregister 15B to M Memory 10B, it also orders the switching matrix to enable a transmission path between W register 16 and M access control 12. In response to an access command signal, M access control 12 causes a word to be read from the addressed memory cell within M memory 10B and the addressed word is coupled through the enabled transmission path and is loaded into W register 16.

Fourth, consider the coupling path which exists for retrieving a word from L memory 10A and loading the retrieved word into W register 16. When a select signal orders cross-point switching matrix 17 to couple the address information stored in operand address subregister 15B to L memory 10A, it also orders the switching matrix to enable a transmission path between W register 16 and L access control 11. In response to an access command signal L access control 11 causes a word to be read from the memory cell within L memory 10A which is addressed by operand address subregister 15B and the addressed word is coupled through the enabled transmission path and is loaded into W register 16.

It is possible for more than one coupling path to exist at the same time. For example, there can be a transmission path between instruction register 15 and L access control 11 at the same time that a transmission exists between W register 16 and M access bus 12.

Assume for the moment that instruction address register 18 contains information address of an instruction word which shall be referred to as $I_0$ to the memory $I_0$ is stored in L memory 10A and that data processor is ready to begin the instruction-fetch phase related to $I_0$. A select signal is generated by means not shown and coupled to cross-point switching matrix 17 to allow the instruction address to be coupled to L access control 11. Timing and control circuits 13 then produce an L memory access command signal to command L access control 11 to cause $I_0$ to be read from L memory 10A and coupled through cross-point switching matrix 17 to load instruction register 15. Assume further that $i_0$ is an M memory read instruction. That is, it contains an operator field which instructs the data processor to retrieve an operand word from M memory 10B and an operand address field defining the location within M memory 10B of the operand word. Instruction decode circuitry 14 shown in the bottom left corner of FIG. 2 responds to $I_0$ to produce a signal on one of its output lines to indicate that the data processor is to make an M memory read.

Timing and control circuits 13 are coupled to instruction decode circuitry 14 by lines not shown. In response to an indication on one such line that the data processor is to make an M memory read, timing and control circuits 13 produce a signal to change the contents of instruction address register 18 so that the next instruction, referred to as $I_1$ herein, is stored in instruction address register 18. Timing and control circuits 13 also produce a simultaneous access signal which enables transmission paths to both memory subsystems. Therefore $I_1$ will be fetched from L memory 10A and loaded into instruction register 15 at the same time that the operand word ordered by $I_0$ is being read from M memory 10B and loaded into W register 16.

Figure 3:
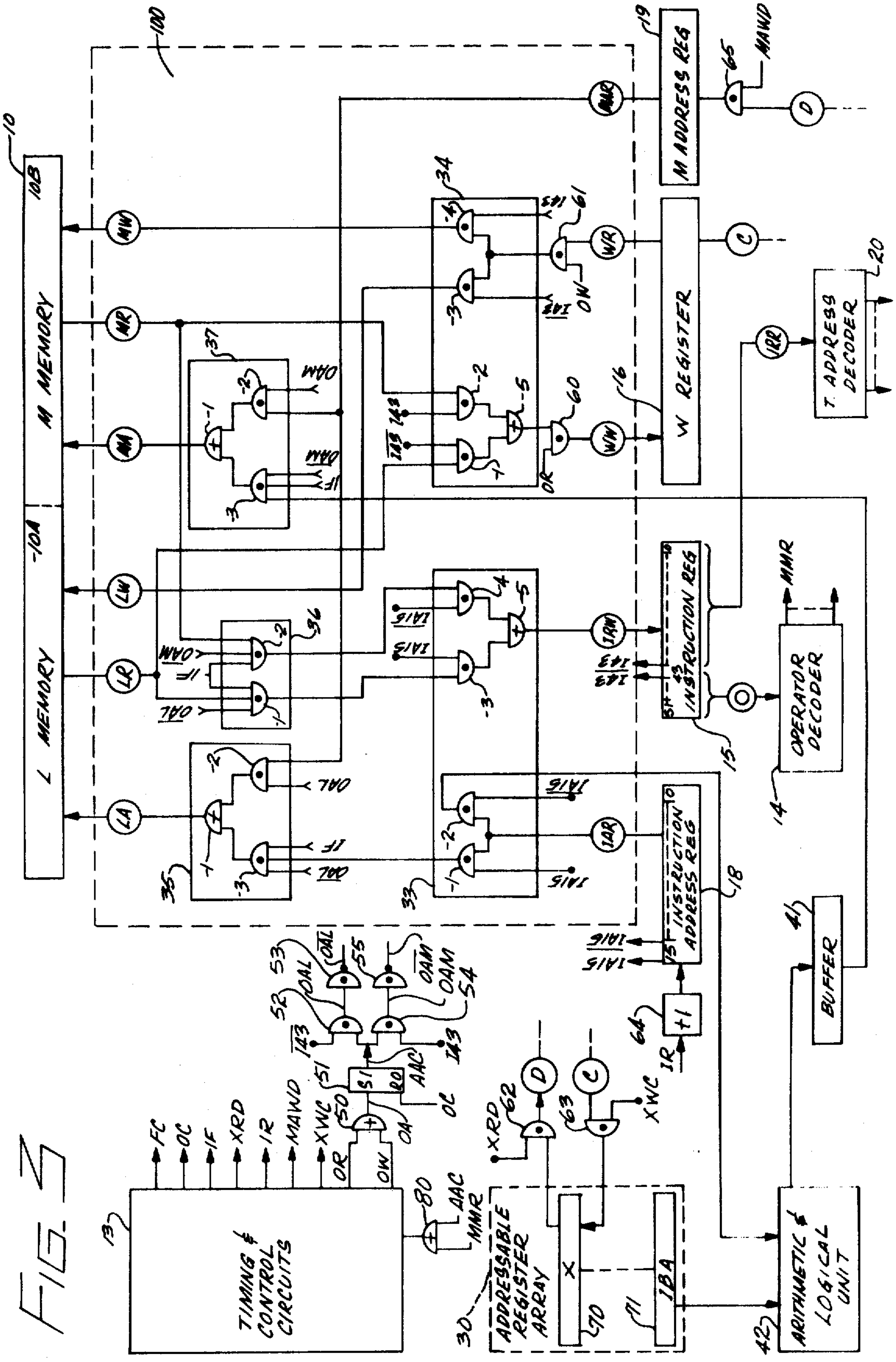
FIG. 3 is a detailed block diagram of a data processing system embodying the present invention.

FIG. 3 shows the details of a stored program data processing system embodying the present invention. The data processing system includes memory system 10 comprising a pair of independently accessible addressable memory subsystems shown as L memory 10A and M memory 10B. Memory system 10 stores instruction words of programs and operand words which are to be processed under programmatic control. Each memory subsystem has a plurality of memory cells each of which can store a fixed number of bits. In the preferred embodiment each memory cell stores 52 bits. The bits of the 52-bit word stored in a memory cell are numbered 0 through 51 with bit 0 being the least significant bit and bit 51 being the most significant bit. A particular field within a word shall be identified herein by using the nomenclature X[m:n] where X designates the location of the word, *m* denotes the most significant bit of the field, and *n* denotes the number of bits within the field. The number of memory cells within the memory subsystems is called its word capacity. In the preferred embodiment the word capacity for L memory 10A is $2^{14}$ words and the word capacity for M memory 10B is $2^{20}$ words. Each memory cell within L memory 10A can be addressed by a 14-bit address and each memory cell within M memory 10B can be addressed by a 20-bit address word.

The system data processor is shown generally below memory system 10. The data processor the fetching arithmetic and logical unit 42 and a control element. The control element of the data processor comprises those parts which effect the carrying out of instructions in proper sequence, the interpretation of each instruction and the application of the proper commands to the arithmetic unit and other circuits such as the memory system in accordance with this interpretation. The parts of the control element which are pertinent to an understanding of an operation of the improved fetch overlap feature are specifically shown; the remaining parts of the control element are shown generally as timing and control circuits 13.

Below timing and control circuits 13 is shown addressable register array 30 which comprises a plurality of general purpose storage registers. Only two registers of the array, X register 70 and IBA register 71, are specifically shown and the dotted lines drawn between them are intended to suggest the existence of others.

The parts of the control element which effect the interpretation of each instruction are shown as operator decoder 14 and I address decoder 20. The decoders are conventional gating circuits which interpret the operator field and the address field of instruction words which have been fetched from memory system 10. Operator decoder 14 is coupled to timing and control circuits 13 by lines not shown to transmit signals thereto indicating what type of a processing operation has been ordered by an instruction. One exemplary type of processing operation is indicated by the lines labeled MMR which is an acronym for M memory read.

Timing and control circuits 13 produce a sequence of command pulses on a plurality of output lines which are to be applied to arithmetic and logical unit 42 and other circuits to order these circuits to carry out the instruction as interpreted by operator decoder 14. Many command signals would be necessary to carry out all of the different instructions in a general purpose data processor. Of these only the following signals which are relevant to the operation of the fetch overlap feature need be considered herein. FC is an indicator signal which becomes a "138 each time an instruction-fetch phase has been completed. OC is an indicator signal which becomes a "1" each time an execute-operation phase has been completed. IF is a command signal which orders an instruction-fetch phase to commence. XRD is a gating signal which enables the contents of X register 70 to be gated onto a D bus. IR is an instruction release indicator signal which indicates that the contents of an instruction register need no longer be stored therein. MAWD is a gating signal which enables the signals carried on a D bus to be written into an M address register. XWC is a gating signal which enables signals carried by a C bus to be written into X register 70. OR is an operand retrieve command signal. OW is an operand write command signal. The gates shown adjacent to timing and control circuits 13 are responsive to the operand retrieve and operand write signals to form various indicator signals which are useful in controlling the fetch overlap apparatus. OR gate 50 combines OR and OW to form OA which is an opened access indicator signal. The OA signal is coupled to the set input of flip-flop 51. The "1" side of flip-flop 51 is coupled to an input of AND gate 52 and AND gate 54. The other input to AND gate 52 is $\overline{I43}$ which is derived from instruction register 15. The output of AND gate 52 is OAL which indicates that an operand access is being made from L memory 10A. The output of AND gate 52 is coupled to NAND gate 53. The output of NAND gate 53 is $\overline{OAL}$. $\overline{OAL}$ indicates that no operand access is being made to L memory 10A. AND gate 54 combines the "1" output of flip-flop 51 with I43 which is derived from instruction register 15 to form OAM which indicates that an operand access is being made from M memory 10B. OAM is coupled to the input of NAND gate 55. The output of NAND gate 55 is $\overline{OAM}$ which indicates that no operand access is being made to M memory 10B.

Instruction address register 18 is a 16 flip-flop register storing information representative of the address of a memory cell within memory system 10 which contains an instruction. Normally, the instructions of a program sequence are stored in sequential locations in memory system 10. Therefore the number stored in instruction address register 18 is increased by one each time an instruction word is fetched from memory system 10. Block 64 is intended to suggest the means for incrementing the number stored in instruction address register 18. Of course it is possible for the instruction words to be stored in other than sequential memory cell addresses. For example, the program can include subroutines which are entered by jump instructions. In that event the contents of instruction address register would be changed by means not shown under the control of the jump instruction. The format of the word in instruction address register 18 is as follows: IA[14:14] represents a selected memory address from which a word is to be fetched to give instructions to the data processor. IA15 is a bit stored at IA[15:1] which indicates whether the instruction address represented by IA[14:14] is to be found in L memory 10A or M memory 10B.

Instruction register 15 is a 52 flip-flop register storing 52 bit words which include a pair of sequential instruction words in bits I0 through I51.

The format of these 52 bit words is as follows: I[51:4] is a parity bit and tag field useful in error detection; I[47:24] is a first instruction word and I[23:24] is a second instruction word. The format of the first instruction word is as follows: I[47:5]is an operator field which can specify up to 32 different types of processing operations to be performed during the execute-operation phase of the instruction; I[42:3] is an A field which can be used as will be explained hereinafter as an address of an addressable register within an array 30 in the data processor; I[39:8] and I[31:8] are B and C fields respectively which can also contain a register address or can contain a literal. The second instruction word also contains an operator field, and A, B and C fields. I43 is a bit stored in the operator field of an instruction at I[43:1] which indicates whether an operand is to be exchanged with either L memory 10A or M memory 10B.

M address register 19 is a 20 flip-flop register storing information representing a selected memory system address which either contains an operand to be processed or into which an operand is to be written. W register 16 is a 52 flip-flop register providing temporary storage of the operand words which have either been retrieved from or are to be written into memory system 10. Buffer register 41 is a 20 flip-flop register storing address information which can uniquely identify memory cells within M memory 10B which contain instructions.

Information is transferred between the various parts of the data processing system by means of buses. Each bus has been drawn as a single line connecting the various sources and destinations. It should be remembered, however, that each bus actually comprises a plurality of data transmission lines. For purposes of identification, each bus line includes an encircled identifying label.

A dotted block, identified by the reference numeral 100, has been drawn around the buses and associated gating circuits which couple information between the data processor and memory system 10.

Six buses shown at the top of block 100 and five buses shown at the bottom of block 100 can be coupled together in various ways to enable the data processor to fetch an instruction from either L memory 10A or M memory 10B and to enable the data processor to exchange an operand word with either L memory 10A or M memory 10B. The coupling between the buses is effected by cross-point switching matrices and access control elements. The cross-point switching matrices serve as signal switches to couple the signals carried on a source bus to one of two destinations buses thereby effecting a transmission path between a register and the memory system. The access control elements operate as an interlock to prevent more than one source bus from coupling signals to the same destination bus at the same time. Since cross-point switching matrices are well known in the art they will not be described in detail herein. Instead the cross-point switching matrix is symbolized in drawing by a plurality of gates in order to simplify the description. It should be remembered, however, that for each of the gates shown in the drawing there are a plurality of lines which are gated.

Blocks have been around some of these gates to indicate a functional relationship. The gates shown within block 33 serve to select which of the two memory subsystems is to be coupled to instruction address register 18 and instruction register 15 for the purpose of fetching an instruction word. The gates within block 34 serve to select which of the two memory subsystems is to be coupled to M address register 19 and W register 16 for the purpose of exchanging an operand word. The gates within blocks 35, 36 and 37 serve as access control elements which prevent a simultaneous access to the same memory subsystem.

As a means of identifying the various gates the following scheme has been adopted. The gates included within a block have been assigned successive dash numbers starting from the left-hand corner of the block and proceeding clockwise around the block. Each gate will be referred to herein by the reference numeral of the block followed by its assigned dash number. For example, within block 33 four AND gates are shown in a row from left to right from the top of the block which will be referred to as 33–1, 33–2, 33–3, and 33–4, and an OR gate is shown at the bottom of the block which will be referred to as 33–5.

The cross-point switching matrix makes possible four different ways of coupling the buses together.

First: Bus IAR couples the contents of instruction address register 18 to one of the two inputs of AND gate 33–1. The other input to AND gate 33–1 is IA15. The output of AND gate 33–1 is coupled to one of three inputs of AND gate 35–3. The other two inputs of AND gate 35–3 are $\overline{OAL}$ and IF. The output of AND gate 35–3 is coupled to one of two inputs to OR gate 35–1. The output of OR gate 35–1 is coupled to bus LA. By virtue of the foregoing coupling the address information stored in instruction address register 18 can be coupled to L memory 10A under the following conditions: IA15 must be a "1" thereby indicating that the specified instruction word is stored in the L memory 10A; $\overline{OAL}$ must be a "1" thereby indicating that no operand access to L memory 10A is in process; and IF must be a "1" indicating that an instruction-fetch cycle has been commanded.

Bus LR couples an addressed instruction word from L memory 10A to one of three inputs to AND gate 36–1. The other two inputs to AND gate 36–1 are $\overline{OAL}$ and IF. The output of AND gate 36–1 couples to one of two inputs of AND gate 33–3. The other input to AND 33–3 is IA15. The output of AND gate 33–3 couples to one input of OR gate 33–5. The output of OR gate 35–5 couples to bus IRW. By virtue of the foregoing coupling the addressed instruction words stored in L memory 10A will be fetched and coupled to instruction register 15 under the following conditions: IA15 must be a "1" thereby indicating that the addressed instruction word is stored in L memory 10A; $\overline{OAL}$ must be a "1" thereby indicating that no operand access to L memory 10A is in process; and IF must be a "1" thereby indicating that an instruction-fetch cycles has been commanded. These are the same conditions which are necessary for coupling address information from instruction address register 18 to L memory 10A. Therefore it can be seen that when instruction address register 18 selects a memory cell within L memory 10A the contents of that selected memory cell will be read out of L memory 10A and written in to instruction register 15.

Second: Bus IAR also couples the contents of instruction address register 18 to one of two inputs of AND gate 33-2. The other input to AND gate 33-2 is $\overline{IA15}$. The output of AND gate 33-2 couples to arithmetic and logical unit 42. Arithmetic and logic unit 42 adds the 14 bits of information coupled from instruction address register 18 and adds that information to information stored in the register labeled IBA within addressable register array 30 to form a 20 bit address word which can uniquely identify a memory cell within M memory 10B. This 20 bit word is coupled from arithmetic and logic unit 42 to buffer register 41. The output of buffer register 41 couples to one of three inputs of AND gate 37-3. The other two inputs to AND 37-3 are IF and $\overline{OAM}$. The output of AND gate 37-3 couples to one of two inputs of OR gate 37-1. The output of OR gate 37-1 couples to bus MA. By virtue of the foregoing coupling, information stored in instruction address register 18 can be coupled to M memory 10B under the following conditions: $\overline{IA15}$ must be a "1" thereby indicating that the specified instruction word is stored in M memory 10A; $\overline{OAM}$ must be a "1" thereby indicating that no operand to M memory 10B is in process and IF must be a "1" thereby indicating that an instruction-fetch cycle has been commanded.

Bus MR couples an addressed instruction word from M memory 10B to one of three inputs of AND gate 36-2. The other two inputs of AND gate 36-2 are $\overline{OAM}$ and IF. The output of AND gate 36-2 is coupled to one of two inputs of AND gate 33-4. The other input to AND gate 33-4 is $\overline{IA15}$. The output of AND gate 33-4 is coupled to one of two inputs to OR gate 33-5. The output of OR gate 33-5 couples to bus IRW. By virtue of the foregoing coupling, an addressed instruction word stored in M memory 10B will be fetched and coupled to instruction register 15 under the following conditions: $\overline{IA15}$ must be a "1" thereby indicating that the specified instruction word is stored in M memory 10A; $\overline{OAM}$ must be a "1" thereby indicating that no operand access to M memory 10B is in process; and IF must be a "1" thereby indicating that an instruction cycle has been commanded. These are the same conditions which are necessary for the contents of instruction address register 18 to be coupled to M memory 10B to provide address information thereto. Thus it can be seen that when instruction address register 18 provides information for fetching instruction from M memory 10B the selected instruction will be read from M memory 10B and written into instruction register 15.

Third: Bus MAR couples the contents of M address register 19 to one of two inputs of AND gate 37-2. The other input to AND gate 37-2 is OAM. The output of AND gate 37-2 couples to one of two inputs of OR gate 37-1. The output of OR gate 37-1 couples to bus MA. By virtue of the foregoing coupling, the address information stored in M address register 19 can be coupled to M memory 10B if OAM is a "1" thereby indicating that an operand access from M memory 10B has been commanded.

Bus MR couples to one of two inputs of AND gate 34-2. The other input of AND gate 34-2 is I43. The output of AND gate 34-2 coupled to OR gate 34-5. The output of OR gate 34-5 couples to one input of AND gate 60. The other input of AND gate 60 is OR. The output of AND gate 60 couples to bus WW. By virtue of the foregoing coupling an addressed operand word stored independently M memory 10B will be retrieved and coupled to W register 16 under the following conditions: I43 must be a "1" processor operation that a memory cell within M memory 10B has been addressed and OR must be a "1" indicating that an operand retrieve has been commanded. These conditions are the logical equivalent of the conditions necessary for contents of M address register 19 to be coupled to M memory 10B. Therefore requiring can be seen operand when M address register 19 selects memory cell within M memory 10B and an instruction retrieve command has been given the instruction of the addressed memory cell will be read from M memory 10B and written into W register 16.

Bus WR couples to one of two inputs of AND gate 61. The other input to AND gate 61 is OW. The output of AND gate 61 couples to one input of AND gate 34-4; the other input to AND gate 34-4 is 143. The output of AND gate 34-4 couples to bus MW. By virtue of the foregoing coupling, an operand word stored in W register 16 can be written into M memory 10B at the memory cell addressed by M address register 19.

Fourth: Bus MAR also couples the contents of M address register to one one two inputs of AND gate 34-2. The other input of AND gate 35-2 is OAL. The output of AND gate 34-2 couples to one of two inputs of OR gate 35-1. The output of OR gate 35-1 couples to bus LA. By virtue of the foregoing coupling 14 of the 20 bits of address information stored in M address register 19 can be coupled to L memory 10A to address a memory cell therein if OAL is a "1," thereby indicating that an operand access has been ordered from L memory 10A.

Bus LR couples a selected operand word from L memory 10A to one of two inputs of AND gate 34-1. The other input of AND gate 34-1 is $\overline{I43}$. The output of AND gate 34-1 couples to one of two inputs of OR gate 34-5. The output of OR gate 34-5 couples to one of two inputs of AND gate 60. The other input of AND gate 60 is OR. The output of AND gate 60 couples to bus WW. By virtue of the foregoing coupling an operand word stored in L memory 10A which has been addressed by M address register 19 can be read out of L memory 10A and written into W register 16 when OR is a "1" thereby indicating that an operand read command has been given.

Bus WR couples an operand word stored in W register 16 to one of two inputs of AND gate 61. The other input to AND gate 61 is OW. The output of AND gate 61 is coupled to one of two inputs of AND gate 34-3. The other input of AND gate 34-3 is $\overline{I43}$. The output of AND gate 34-3 couples to bus LW. By virtue of the foregoing coupling, an operand word can be written into L memory 10A at the memory cell addressed by M address register 19.

Consider now the operation of the data processing system during the instruction-fetch phase and execute-operation phase of a series of typical instructions. Let the first instruction in the series be called $I_0$ and the second instruction in the series be called $I_1$. Let the first instruction be the latter of the pair of instruction words of the 52 bit word. Assume that $I_0$ orders the data processor to make an access to M memory 10B to retrieve an operand word therefrom. $I_0$ will contain an operator field specifying that an memory read operation is to be executed and it will also contain address fields which are used in determining the address of the memory cell within M memory 10B which contains the operand to be read out.

When the processing of the program sequence has progressed to the point at which $I_0$ should be carried out, instruction address register 18 will contain information representing the memory system address of $I_0$. $I_0$ could be stored in either L memory 10A or M memory 10B. It can be assumed for purposes of explanation without loss of generality that $I_0$ is stored in L memory 10A. Therefore IA15 will be a "1."Assume further that no operand access to L memory 10A is in process. Therefore $\overline{OAL}$ will be a "1." Under these conditions a transmission path exists between L memory 10A and instruction address register 18 and instruction register 15.

When timing and control circuit 13 produces IF to command the instruction-fetch phase to commence, instruction $I_0$ will be read from L memory 10A and loaded into instruction register 15.

THe address field of $I_0$ will be coupled by bus IRR from instruction register 15 to I address decoder 20 where it is decoded to determine where the data processor will find the memory system address which contains the operand to be read out. This address information will have been previously stored by earlier instructions from the program sequence in a register within addressable register array 30 such as X register 70. The contents of X register 70 will be coupled to bus D by AND gate 62 in response to the XRD signal. The information carried by the D bus will be coupled to M address register 19 by AND gate 65 in response to the MAWD signal.

Operator decoder 14 will interpret the operator field of instruction $I_0$ and couple signal MMR by lines not shown through OR gate 80 to timing and control circuits 13 to indicate that an M memory read operation is to be executed. In response, timing and control circuits 13 produces OR which is coupled through OR gate 50 to the set input of flip-flop 51. ONce flip-flop 51 has been set it serves as an autonomous access control device which remembers that an operand access has been ordered. The signal at the "1" output of flip-flop 51 is an autonomous access control signal and is labeled AAC in the drawing. AAC is coupled back by lines not shown through OR gate 80 to timing and control circuits 13. At this point it is no longer necessary for instruction register 15 to continue to remember that an M memory read instruction has been given because flip-flop 51 serves this purpose. Timing and control circuits 13 then produces the IR signal indicating that $I_0$ can be released from instruction register 15. At this point the fetch overlapping commences. Block 64 causes the number stored in instruction address register 18 to be increased by 1 so that $I_1$ can be addressed. The instruction-fetch phase of $I_1$ can now commence. Therefore, the data processor will make an access to L memory 10A to the cell addressed by instruction address register 18, read out $I_1$ which is stored therein and load $I_1$ into instruction register 15. At the very same time, the data processor will make an access to M memory 10B to the cell addressed by M address register 19, read out the operand which is stored therein and load that operand into W register 16. Thus it can be seen that two separate processes are carried out simultaneously. That is, the data processor performs the execute-operation phase of instruction $I_0$ by reading out an operand from M memory 10B and writing that operand into W register 16 at the same time that the processor performs the instruction-fetch phase of instruction $I_1$ by reading instruction $I_1$ from L memory 10A and writing that instruction into instruction register 15.

It should be noted that modifications could be made to the above described specific embodiment without departing from the spirit of the invention. For example, the instruction words and operand words could be distributed between the memory subsystems in a mutually exclusive manner. In such an embodiment the instruction address register and the M address register would each be coupled to only one memory system. As another example, the invention could be embodied in data processing systems having different instruction word formats. The instruction word could contain a larger or smaller operator field to specify a larger or smaller number of different types of processing operations as desired. The instruction word could contain a single address which directly specifies a memory cell containing an operand word instead of containing an indirect address as in the above described preferred embodiment. Obviously, many other modifications and variations of the present invention are possible. It is therefore to be understood that within the scope of the appended claims, the invention may be practiced other than as specifically illustrated and described.

What is claimed is:

1. A data processing system comprising at least two independently operable memory subsystems for storing program instructions and operand, a programmable data processor operative under control of a program instruction directing the data processor operation for processing an operand, and including a first input for receiving an instruction and a second input for simultaneously receiving an operand, means for coupling an instruction from one of said at least two memory subsystems to said instruction input and for simultaneously coupling an operand from another of said at least two memory subsystems to said operand input, and means responsive to an instruction requiring retrieval of an operand for selectively causing one of said at least two memory subsystems to provide an instruction through said coupling means to said instruction input and simultaneously causing another of said at least two memory subsystems to provide an operand through said coupling means to said operand input.

2. A data processing system comprising at least two independently operable memory subsystems for storing program instructions and operands, a programmable data processor comprising instruction storage means for storing a program instruction directing the data processor operation and operand storage means for storing an operand for processing, means for coupling an instruction from one of said at least two memory subsystems to the instruction storage means and for simultaneously coupling an operand from another of said at least two memory subsystems to said operand storage means, and means responsive to a stored instruction requiring retrieval of an operand for selectively causing one of said at least two memory subsystems to provide an instruction through said coupling means to said instruction storage means and simultaneously causing another of said at least two memory subsystems to provide an operand through said coupling means to said operand storage means.

3. A data processing system according to claim 2 wherein the said memory subsystems are addressable and wherein the last named means comprises means for storing an instruction address, means for storing an operand address and means for coupling said instruction and operand addresses to the respective two memory subsystems for which the instruction and operand are to be obtained.

4. A data processing system according to claim 3 wherein the said instruction address indicates the particular memory subsystem from which the instruction is to be obtained, the coupling means being operative for coupling the instruction from the indicated memory subsystem to the instruction storage means.

5. A data processor according to claim 2 wherein said instructions indicate a memory subsystem from which an operand is to be obtained, and the coupling means is operative for coupling the operand from the indicated memory subsystem to said operand storage means.

6. Apparatus for increasing the processing efficiency of an internally programmed data processing system, the apparatus comprising:

a memory system comprising a pair of independently accessible addressable memory subsystems for storing instruction words of a program and operand words to be processed under programmatic control, the program including instruction words containing an operator field which specifies that an operand word is to be retrieved from the memory system and also containing an operand address field representative of the address of the operand within the memory system;

a register for storing information representing a selected memory system address which contains an instruction word from the program sequence, the register being responsive to control signals to change the information it stores to represent a different memory system address storing a subsequent instruction word from the program sequence;

means responsive to the stored information representing selected memory system addresses for fetching selected instruction words from the memory system;

a register for temporarily storing the fetched instruction words; and means responsive to the operand address field of an operand instruction word fetched from the memory system for retrieving an operand word from one of the independently accessible memory subsystems at the same time that the means for fetching instruction words is fetching an instruction word from the other independently accessible memory subsystem.

7. The apparatus as defined by claim 6 in which the means for fetching selected instructions includes a source bus responsive to stored information representing selected memory system addresses, a pair of buses each coupled to one of the memory subsystems, and switching matrix coupling the source bus to the pair of buses for coupling the stored information representing selected memory system addresses to either of the memory subsystems.

8. The apparatus as defined by claim 7 wherein the information representing a selected memory system address containing an instruction word contains a bit which indicates the memory subsystem that contains the selected instruction word and the switching matrix couples the stored information representing selected memory system addresses to the indicated memory subsystem in response to the bit.

9. A data processing system comprising:

a memory system having a plurality of memory cells for storing instruction words of program sequences and operand words to be processed under programmatic control, the memory cells being distributed between a pair of addressable memory subsystems each having independent access means for enabling words to be written into or read out of the memory cells therein, thereby allowing simultaneous access to both memory subsystems;

a data processor coupled to the memory system for processing operand words as specified by instruction words stored in the memory system, the data processor including means for controlling the fetching of instruction words and the retrieval of operand words from the memory system, the means being responsive to a previously fetched instruction from the program sequence for controlling the retrieval of an operand word out of a memory cell within one of the memory subsystems at the same time that the means controls the fetching of another instruction word of the program sequence from a memory cell within the other memory subsystem.

10. A data processing system according to claim 9 wherein the means for controlling the fetching of instruction words and the retrieval of operand words comprises a first register for storing information representing an address of a memory cell which contains an instruction word, a second register for storing instruction words which have been read out of a memory cell addressed by the first register, a third register for storing information representing an address of a memory cell which contains an operand word, a fourth register for storing operand words which have been read out of a memory cell addressed by the third register and independent access control elements for controlling the exchange of address information and words between the four registers and the memory system.

22. A data processing system according to claim 10 wherein the means for controlling the fetching of instruction words and the retrieval of operand words comprises in addition a cross point switching matrix for exchanging address information and words between the register and either memory subsystem.

12. A data processing system according to claim 11 wherein 11 number of memory cells are distributed to one of the memory subsystems than to the other and the first and third registers store information having different field lengths and wherein the means for controlling the fetching of instruction words and the retrieval of operand words comprises means responsive to the information having the shorter field length for forming an address for the memory subsystem having the larger number of memory cells.

13. A data processing system according to claim 12 comprising in addition a storage device responsive to predetermined instruction words which order the data processor to effect an operand access to the memory system for indicating that an operand access has been ordered until the operand access has been completed and wherein the means for controlling the fetching of instruction words and the retrieval of operand words responds to said indication to change the information stored in the first register to represent an address of another instruction word from the program sequence.

14. A data processing system comprising at least two independently operable memory subsystems for storing program instructions and operands, a programmable data processor operative under control of a program instruction directing the data processor operation for processing an operand and including a first input for receiving an instruction and a second input through which operands may be simultaneously transferred and means for coupling an instruction from one of said at least two memory subsystems to said instruction input and for simultaneously coupling an operand between another of said at least two memory subsystems and said operand input.

PO-1050
(5/69)

UNITED STATES PATENT OFFICE
CERTIFICATE OF CORRECTION

Patent No. 3,609,700 Dated September 28, 1971

Inventor(s) James E. Wollum, Richard S. Sharp

It is certified that error appears in the above-identified patent and that said Letters Patent are hereby corrected as shown below:

Col. 1, line 41, after "of" insert --discrete--.

Col. 2, line 68, delete "point" and insert --same--.

Col. 3, line 45, delete "A data" and insert --sequence--
line 45, delete "independently" and insert --the--
line 55, delete "operand" and insert --memory--.

Col. 4, line 9, delete "form" and insert --is--
line 53, delete "sorting" and insert --data--
line 63, delete "control" and insert --a--.

Col. 5, line 36, delete "bus" and insert --control--
line 38, delete "information" and insert --the--
line 39, delete "to the memory" and insert --and that--
line 48, delete "$i_0$" and insert --$I_0$--.

Col. 6, line 19, delete "the fetching" and insert --comprises--
line 47, delete "lines" and insert --line--
line 58, delete "138" and insert --"1"--
line 75, delete "opened" and insert --operand--.

Col. 8, line 24, after "been" insert --drawn--

Col. 9, line 31, after "operand" insert --access--
line 72, delete "independently" and insert --in--
line 74, delete "processor operation" and insert --indicating--

Col.10, line 4, delete "requiring" and insert --it--
line 5, delete "operand" and insert --that--
line 6, delete "instruction" and insert --operand--
line 7, delete "instruction" and insert --contents--

PO-1050
(5/69)

UNITED STATES PATENT OFFICE
CERTIFICATE OF CORRECTION

Patent No. 3,609,700 Dated September 28, 1971

Inventor(s) James E. Wollum, Richard S. Sharp

It is certified that error appears in the above-identified patent and that said Letters Patent are hereby corrected as shown below:

Col. 10, line 18, after "register" insert --19--
line 18, after "to one" insert --of--
line 18, delete "34-2" and insert --35-2--
line 20, delete "34-2" and insert --35-2--
line 72, delete "circuit" and insert --circuits--.

Col. 11, line 1, change "THe" to --The--
line 18, change "ONce" to --Once--.

Col. 12, line 74, delete "operand".

Col. 14, line 10, renumber claim from "22." to --11.--
line 14, delete "register" and insert --registers--
line 16, delete "11" and insert --a larger--.

Signed and sealed this 9th day of May 1972.

(SEAL)
Attest:

EDWARD M.FLETCHER,JR.
Attesting Officer

ROBERT GOTTSCHALK
Commissioner of Patents